United States Patent
Lawrence et al.

(10) Patent No.: US 11,744,763 B2
(45) Date of Patent: Sep. 5, 2023

(54) APPARATUS AND/OR METHOD FOR POSITIONING A HAND FOR REHABILITATION

(71) Applicant: Bionik, Inc., Watertown, MA (US)

(72) Inventors: Stephen Lawrence, Watertown, MA (US); Taya Hamilton, Watertown, MA (US)

(73) Assignee: Bionik, Inc., Watertown, MA (US)

( * ) Notice: Subject to any disclaimer, the term of this patent is extended or adjusted under 35 U.S.C. 154(b) by 930 days.

(21) Appl. No.: 16/719,821

(22) Filed: Dec. 18, 2019

(65) Prior Publication Data

US 2020/0368095 A1 Nov. 26, 2020

Related U.S. Application Data

(60) Provisional application No. 62/780,975, filed on Dec. 18, 2018.

(51) Int. Cl.
*A61H 1/02* (2006.01)
*B25J 5/02* (2006.01)

(52) U.S. Cl.
CPC .............. *A61H 1/0285* (2013.01); *B25J 5/02* (2013.01); *A61H 2201/1638* (2013.01); *A61H 2201/1659* (2013.01)

(58) Field of Classification Search
CPC .......... A61H 1/0285; A61H 2201/1638; A61H 2201/1659; A61H 1/0277; A61H 2201/0192; A61H 2201/5007; A61H 2201/5023; A61H 2201/5097; A61H 1/0288; A61H 1/00; B25J 5/02
See application file for complete search history.

(56) References Cited

U.S. PATENT DOCUMENTS

| | | | | |
|---|---|---|---|---|
| 4,875,469 A | * | 10/1989 | Brook | A61H 1/0288 601/40 |
| 6,477,448 B1 | * | 11/2002 | Maruyama | B25J 13/02 318/568.11 |
| 7,837,599 B2 | * | 11/2010 | Kowalczewski | A63B 23/12 482/904 |
| 9,375,382 B2 | * | 6/2016 | Fausti | A61H 1/0288 |
| 9,375,598 B1 | * | 6/2016 | Lai | A61H 1/0274 |
| 9,522,294 B1 | * | 12/2016 | Kangatharalingam | A63B 21/0724 |
| 9,827,678 B1 | * | 11/2017 | Gilbertson | A47L 11/4055 |
| 10,849,815 B2 | * | 12/2020 | Huang | A61H 1/0285 |

(Continued)

*Primary Examiner* — Garrett K Atkinson
(74) *Attorney, Agent, or Firm* — Forsgren Fisher; James M. Urzedowski; Daniel A. Tysver

(57) ABSTRACT

Disclosed is a hand and arm support assembly for use by a user or patient to rehabilitate a hand of the patient. The hand and arm support assembly includes a hand actuator assembly and a forearm rest assembly. The hand actuator assembly provides a support for a hand engagement assembly having a housing and hand actuator rod engagement members projecting upwards therefrom to engage the hand of the patient. The housing is rotatable to accommodate the position of the patient's hand and the rod engagement members are adapted to travel along slots towards and away from one another. The forearm rest assembly includes a first carriage and a second carriage to support the forearm and elbow of the patient. The first and second carriage can pivot about an axis relative to the housing to further accommodate the position of the patient's arm and elbow.

20 Claims, 13 Drawing Sheets

(56) References Cited

U.S. PATENT DOCUMENTS

| | | | |
|---|---|---|---|
| 11,246,786 B2* | 2/2022 | Tsui | A61H 1/0288 |
| 11,331,239 B2* | 5/2022 | Tsui | A61H 1/0288 |
| 11,385,719 B2* | 7/2022 | Hinchet | B06B 1/0292 |
| 2007/0265146 A1* | 11/2007 | Kowalczewski | G16H 40/63 |
| | | | 482/142 |
| 2013/0072829 A1* | 3/2013 | Fausti | A63B 21/00178 |
| | | | 601/40 |
| 2014/0316308 A1* | 10/2014 | Lee | A63B 23/03508 |
| | | | 601/33 |
| 2015/0104283 A1* | 4/2015 | Nogami | B25J 18/00 |
| | | | 414/730 |
| 2015/0360069 A1* | 12/2015 | Marti | A63B 23/1272 |
| | | | 482/7 |
| 2018/0168907 A1* | 6/2018 | Huang | A61H 1/0288 |
| 2018/0177666 A1* | 6/2018 | Tsui | A61H 1/0288 |
| 2018/0214740 A1* | 8/2018 | Horen | A63B 21/00069 |
| 2019/0192371 A1* | 6/2019 | Tsui | A61F 5/013 |
| 2019/0201273 A1* | 7/2019 | Soltanl-Zarrin | B25J 9/0006 |
| 2020/0222265 A1* | 7/2020 | Ali | A63B 1/00 |
| 2021/0271326 A1* | 9/2021 | Hinchet | G06F 3/016 |
| 2022/0079831 A1* | 3/2022 | Ahmed | G16H 40/63 |

\* cited by examiner

APPARATUS AND/OR METHOD FOR POSITIONING A HAND FOR REHABILITATION

FIELD OF THE INVENTION

The present invention relates generally to a hand positioning apparatus and method, and more particularly to a hand and arm support assembly and/or method for quickly positioning a hand for rehabilitation.

BACKGROUND OF THE INVENTION

People who have arm and hand impairment caused by a medical issue (e.g., stroke) are typically treated using machines that train the arm and hand. Currently, setting up the machines to fit patients can be difficult and/or time consuming. Since patient treatments are scheduled for a preset duration, completing patient setup in the rehabilitation machine in a short amount of time (i.e., minimizing the duration for patient setup) allows for the maximization of treatment time.

In the prior art, rehabilitation machine design has been such that the patient must be manipulated to fit the device. The patient's forearm after a stroke can have an extreme resting geometry. The angles and positions of this impaired forearm (e.g., the patient wrist can be at a small included angle due to muscle high tone whereby muscles pull the wrist towards the body) need to be accounted for in the design of the hand robot portion of the rehabilitation machine during patient setup. For example, as shown in FIG. 1, the angle ("θ") between a forearm axis ("FA") and a hand axis ("HA") is reduced. This process can cause discomfort to patients due to sub-optimal positioning of the hand and/or arm and may reduce the efficacy of the treatment for rehabilitating desired motions such as, for example, grasping and releasing motions depicted by arrows "A" and "B". Persons skilled in the art will understand that the "grasping" motion is generally understood to include the act of taking, holding or seizing firmly with the hand (i.e., arrows "A" and "B" moving towards one another) and that the "release" motion is generally understood as the act of letting go of an object (i.e., arrows "A" and "B" moving away from one another).

In therapy treatment, how effectively and quickly a patient arm and hand can be setup or positioned in the rehabilitation machine can affect the quality and efficacy of the therapy. An earlier start of therapy (i.e., minimal set-up time) during a designated treatment time would allow for an increased number of therapeutic repetitions in addition to providing a therapist with an opportunity to supervise more than one patient at a time.

Accordingly, there is a need for an improved hand positioning solution. What may be needed is an apparatus and/or method that overcomes one or more of the limitations associated with the prior art.

SUMMARY OF THE INVENTION

According to an embodiment of the invention, there is provided a positioning apparatus and/or method to quickly adapt a patient's arm and/or hand to interface with therapy equipment. The positioning apparatus particularly aligns to a patient's (e.g., impaired stroke victim) arms and/or hands (i.e., which may have different positioning from a non-impaired individual). Previous designs require fitting the patient to the therapy device instead of the device adapting to the shape of the impaired patient arm and/or hand.

According to an embodiment of the invention, there is provided a hand and arm support assembly for use by a user or patient to rehabilitate a hand of the patient. The hand and arm support assembly includes a hand actuator assembly and a forearm rest assembly. The hand actuator assembly provides a support for a hand engagement assembly having a housing and hand actuator rod engagement members projecting upwards therefrom to engage the hand of the patient. The housing is rotatable to accommodate the position of the patient's hand and the rod engagement members are adapted to travel along slots towards and away from one another. The forearm rest assembly includes a first carriage and a second carriage to support the forearm and elbow of the patient. The first and second carriage can pivot about an axis relative to the housing to further accommodate the position of the patient's arm and elbow.

According to an embodiment of the invention, there is provided a hand and arm support assembly for use by a user to rehabilitate a hand of the user which may include optimizing the position of a thumb and one or more fingers of the user and stabilizing the forearm. The hand and arm support assembly includes a hand actuator assembly to accommodate the hand. The hand actuator assembly includes a support, a finger holder for receiving the one or more fingers of the user, a thumb holder for receiving the thumb of the user, and a hand engagement assembly mounted on the support that includes a housing defining one or more slots and one or more rod engagement members projecting from the housing and adapted to receive the finger holder and the thumb holder and travel within the one or more slots based on movements of the hand. The housing is rotatable about a rotational axis to accommodate a resting position of the hand. A forearm rest assembly is associated with the hand actuator assembly and includes a carriage for receiving the forearm of the user.

According to an embodiment of the invention, there is provided a method for orienting a thumb and fingers of a user in a hand and arm support assembly for use in rehabilitating a hand. The method includes: (a) a step of positioning a first curved hand engagement member, associated with the thumb of the user, on a first hand actuator rod engagement member; (b) a step of positioning a second curved hand engagement member, associated with the fingers of the user, on a second hand actuator rod engagement member; (c) a step of selecting a rotational position for a hand engagement assembly associated with the first hand actuator rod engagement member and the second hand actuator rod engagement member to optimize placement of the thumb and fingers of the user; and (d) a step of recording the positions of the first curved hand engagement member, the second curved hand engagement member and the hand engagement assembly.

Other advantages, features and characteristics of the present invention, as well as methods of operation and functions of the related elements of the apparatus and method, and the combination of steps, parts and economies of manufacture, will become more apparent upon consideration of the following detailed description and the appended claims with reference to the accompanying drawings, the latter of which are briefly described herein below.

The novel features which are believed to be characteristic of the apparatus and method according to the present invention, as to their structure, organization, use, and method of operation, together with further objectives and advantages thereof, will be better understood from the following drawings in which presently preferred embodiments of the invention will now be illustrated by way of example. It is expressly understood, however, that the drawings are for the purpose of illustration and description only, and are not intended as a definition of the limits of the invention.

A BRIEF DESCRIPTION OF THE SEVERAL VIEWS OF THE DRAWINGS

Figure 7A:
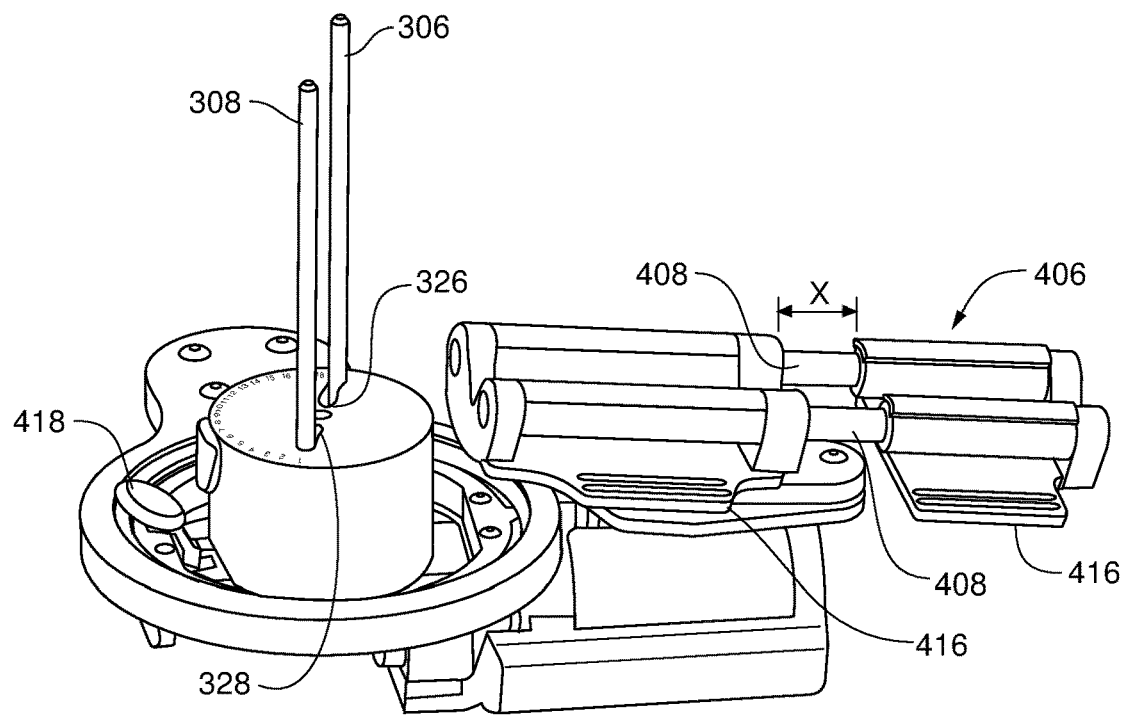
Figure 8A:
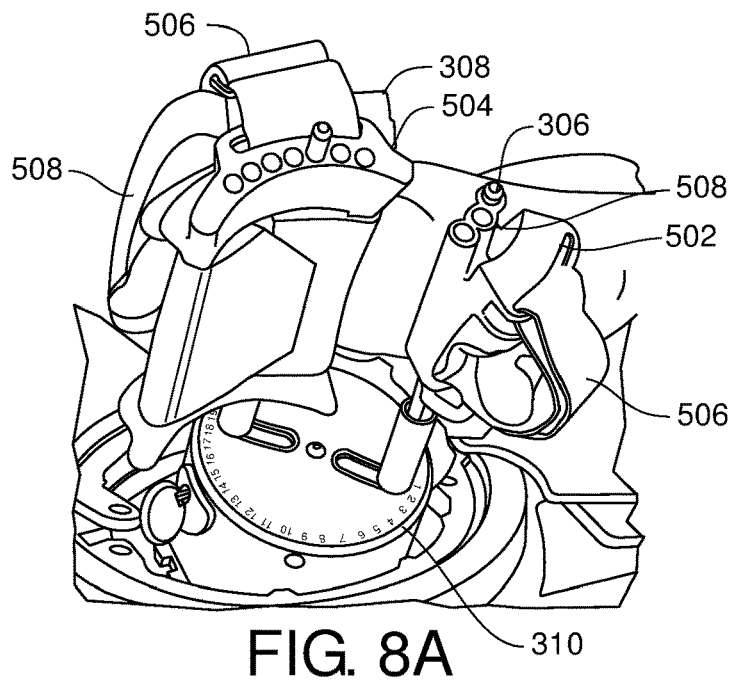
Figure 8B:
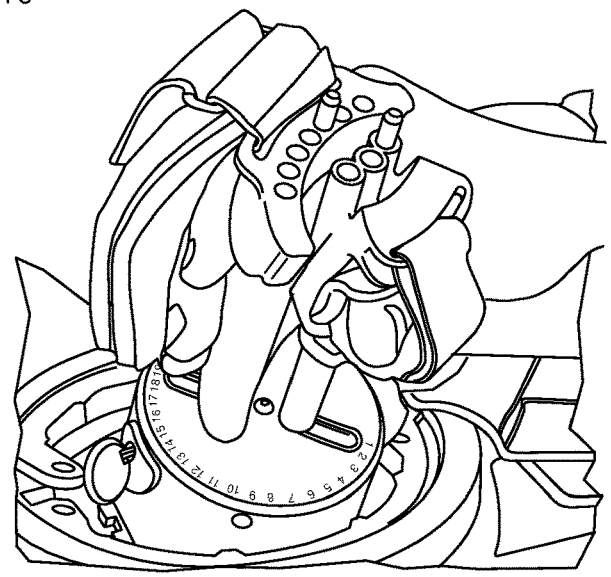
Figure 8C:
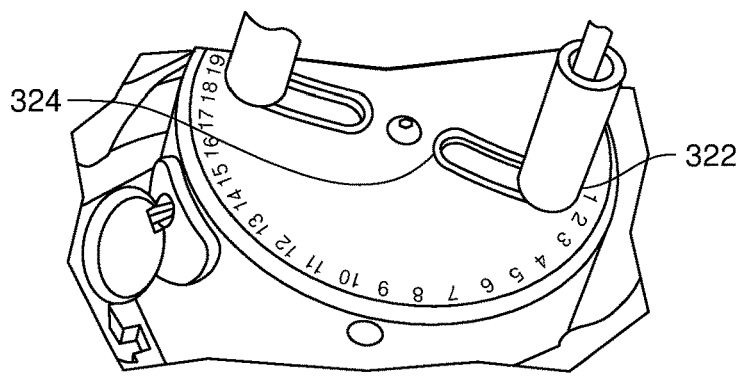
Figure 9:
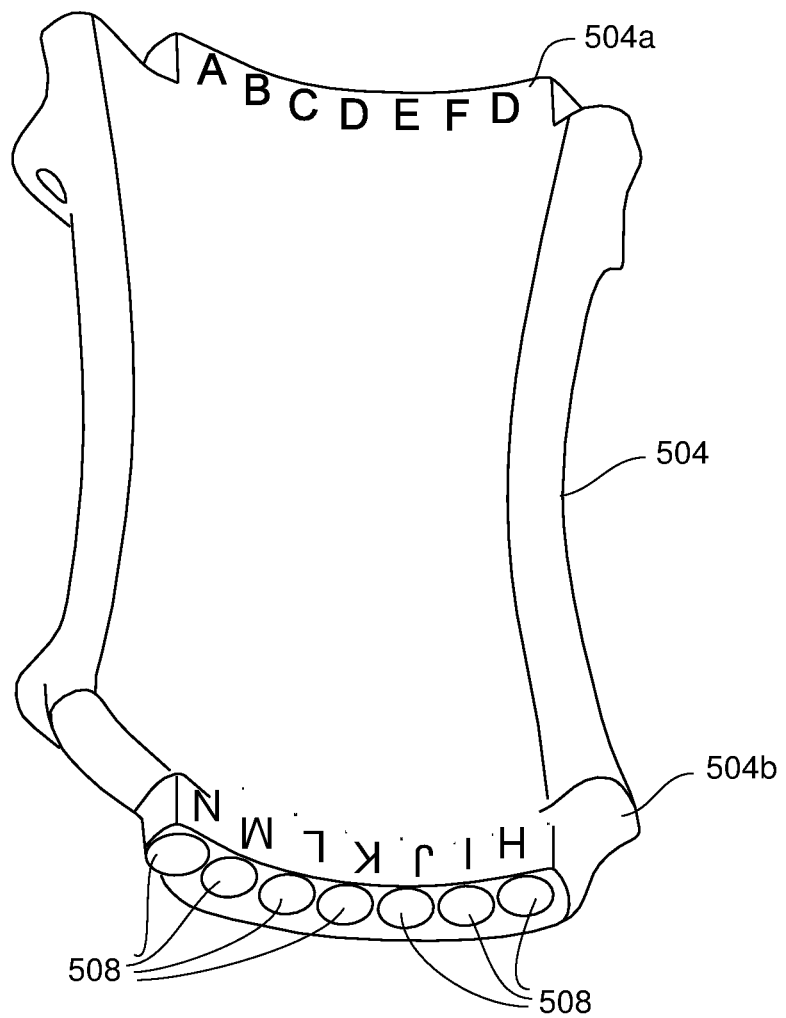
Figure 10:
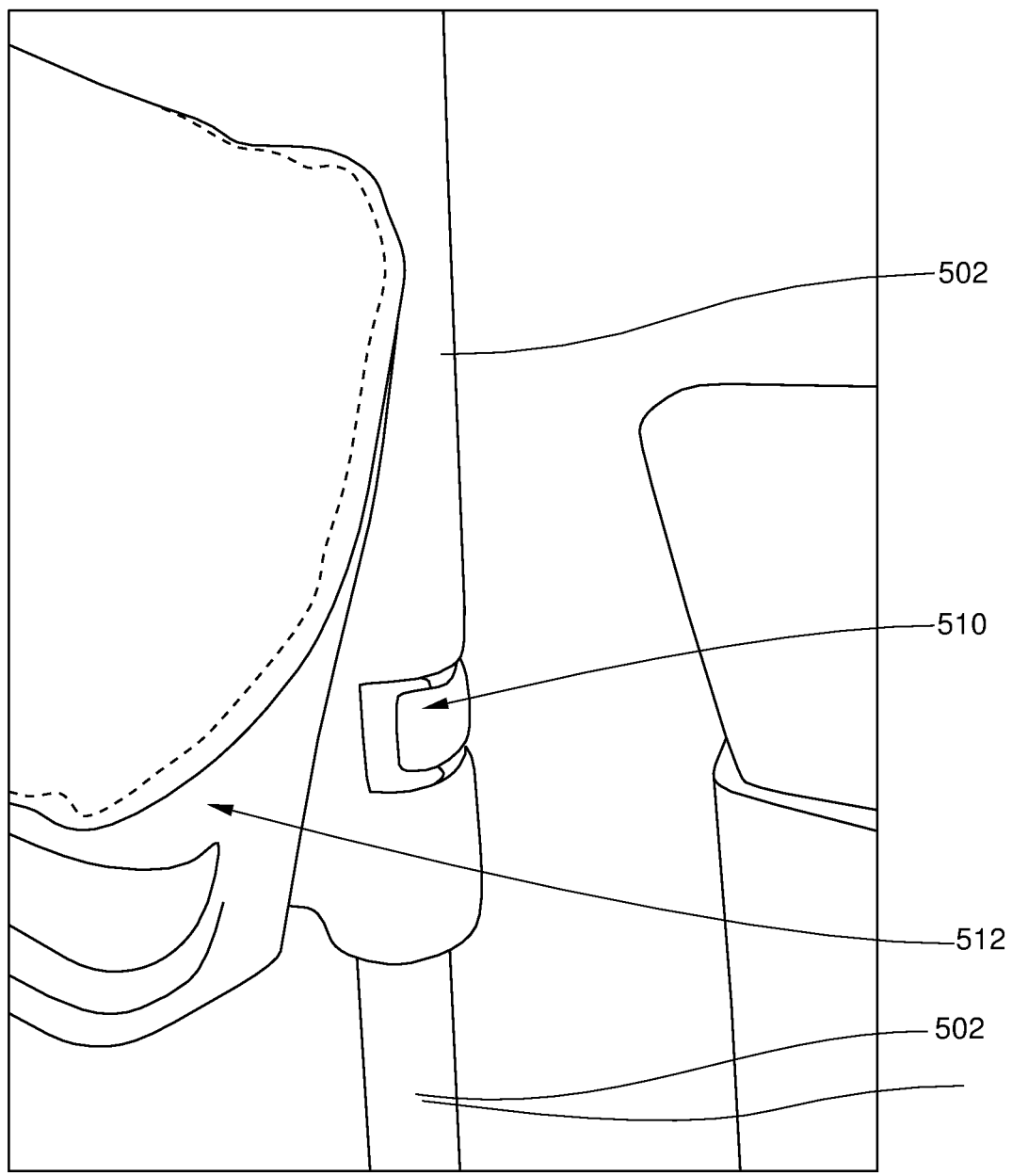
Figure 11:
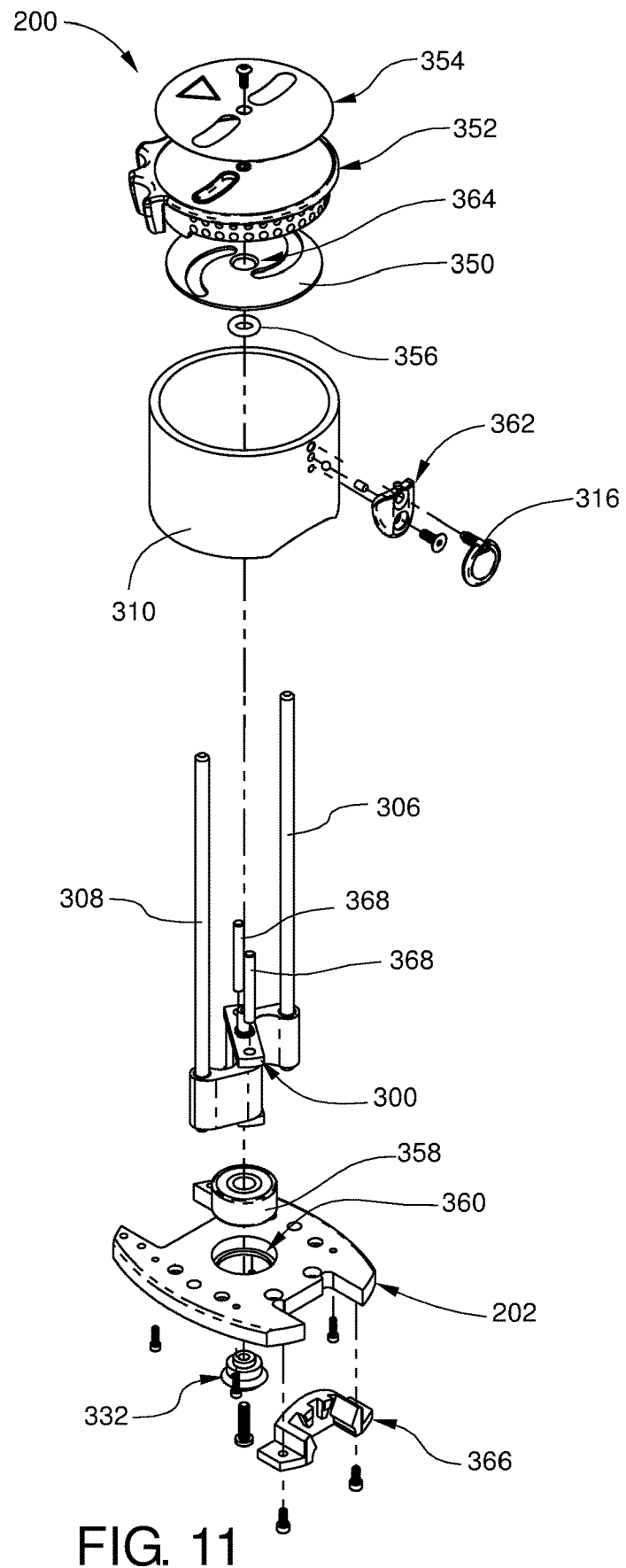
Figure 12:
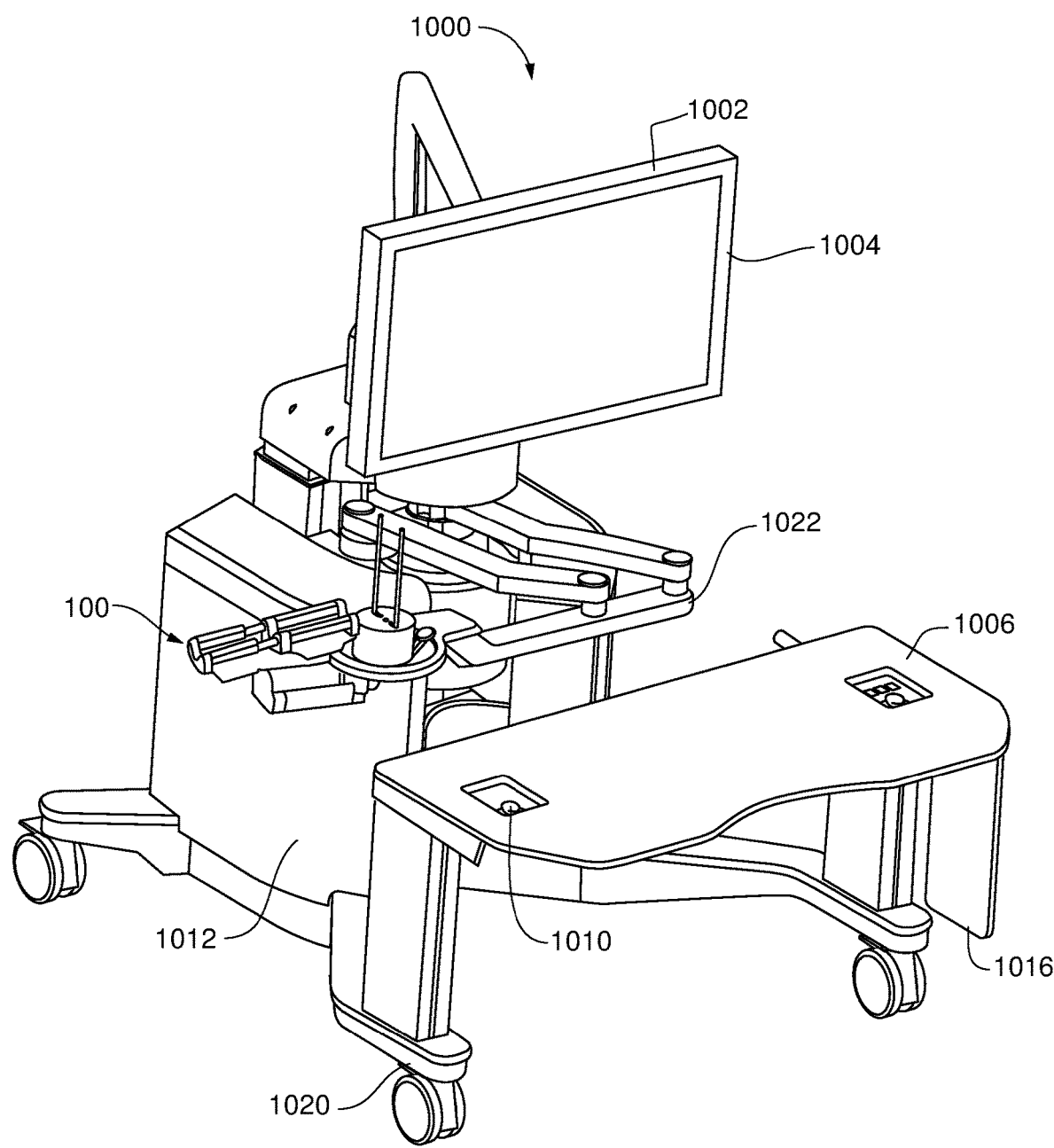
Figure 13:
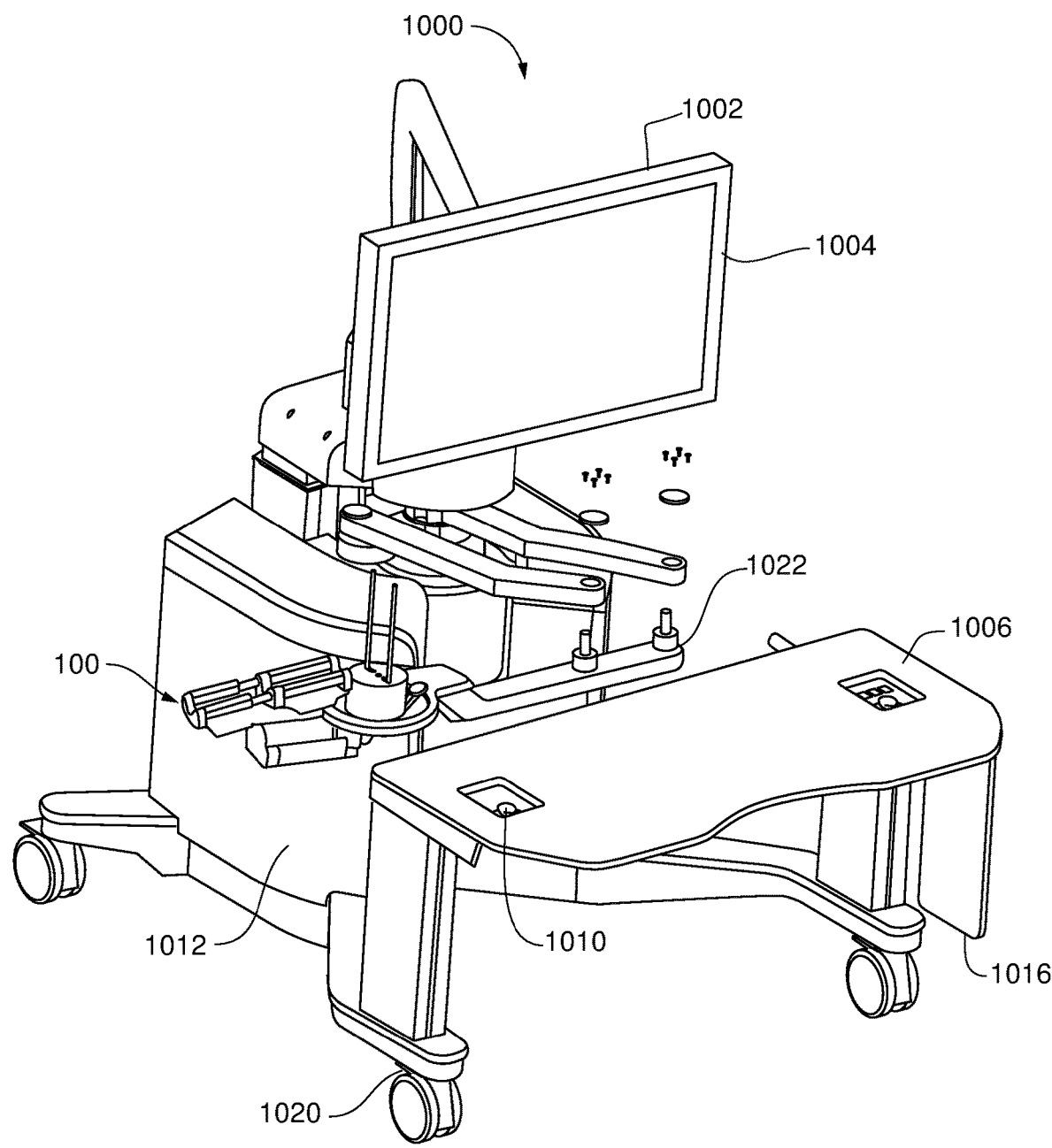

FIGS. 7A and B are a top and bottom perspective view, respectively, of the hand and arm support assembly in accordance with a preferred embodiment;

FIGS. 8A and B are perspective views of the user engaging the first and second rod engagement members in a starting position and a grasping position respectively and FIG. 8C is an enlarged perspective view of the proximal and distal end range positions;

FIG. 9 is a perspective view of the second curved hand engagement member;

FIG. 10 is an enlarged view of the first curved hand engagement member positioned on the first rod engagement member;

FIG. 11 is an exploded view of the hand actuator assembly;

FIG. 12 is an alternate perspective view of the InMotion ARM/HAND™ robot employing the hand robot assembly in accordance with an embodiment of the present invention; and FIG. 13 is the alternate perspective view of the InMotion ARM/HAND™ robot employing the hand robot assembly in accordance with an embodiment of the present invention, with the support structure disconnected from the apparatus.

DETAILED DESCRIPTION OF THE PREFERRED EMBODIMENTS

The description that follows, and the embodiments described therein, is provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The figures are not to scale, and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention.

As used herein, a person skilled in the relevant art may generally understand the term "comprising" to generally mean the presence of the stated features, integers, steps, or components as referred to in the claims, but that it does not preclude the presence or addition of one or more other features, integers, steps, components or groups thereof.

It should also be appreciated that the present invention can be implemented in numerous ways, including as a system, a device, a method, or a computer readable medium wherein program instructions are sent over a network. In this specification, these implementations, or any other form that the invention may take, may be referred to as processes or methods. In general, the order of the steps of the disclosed processes may be altered within the scope of the invention.

In the description and drawings herein, and unless noted otherwise, the terms "vertical", "lateral" and "horizontal", are generally references to a Cartesian co-ordinate system in which the vertical direction generally extends in an "up and down" orientation from bottom to top (z-axis) while the lateral direction generally extends in a "left to right" or "side to side" orientation (x-axis or y-axis depending on figure orientation). In addition, the horizontal direction extends in a "front to back" orientation and can extend in an orientation that may extend out from or into the page (x-axis or y-axis depending on figure orientation).

In order that the invention may be more fully understood, it will now be described, by way of example, with reference to the accompanying drawings in which FIG. 2 through FIG. 13 illustrate embodiments of the present invention.

Figure 1:
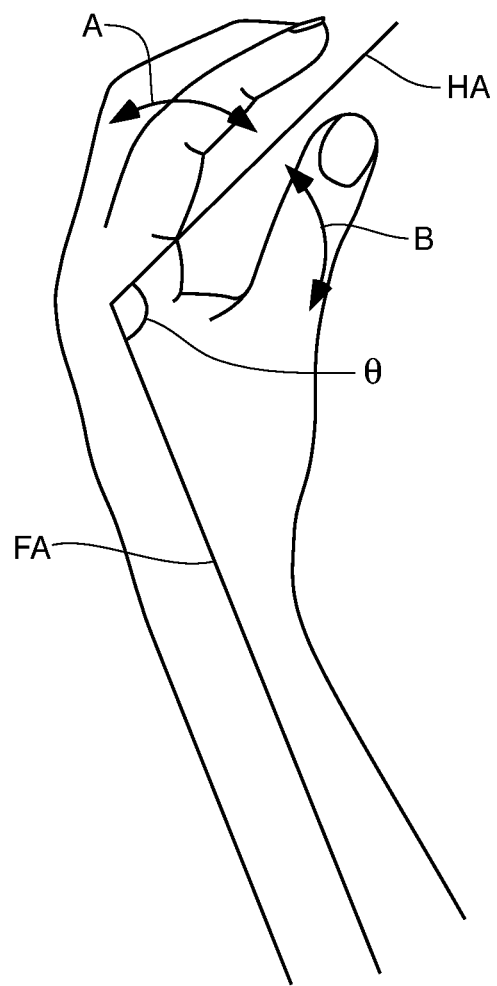
FIG. 1 is a depiction of an impaired forearm with high tone muscle.
Figure 2:
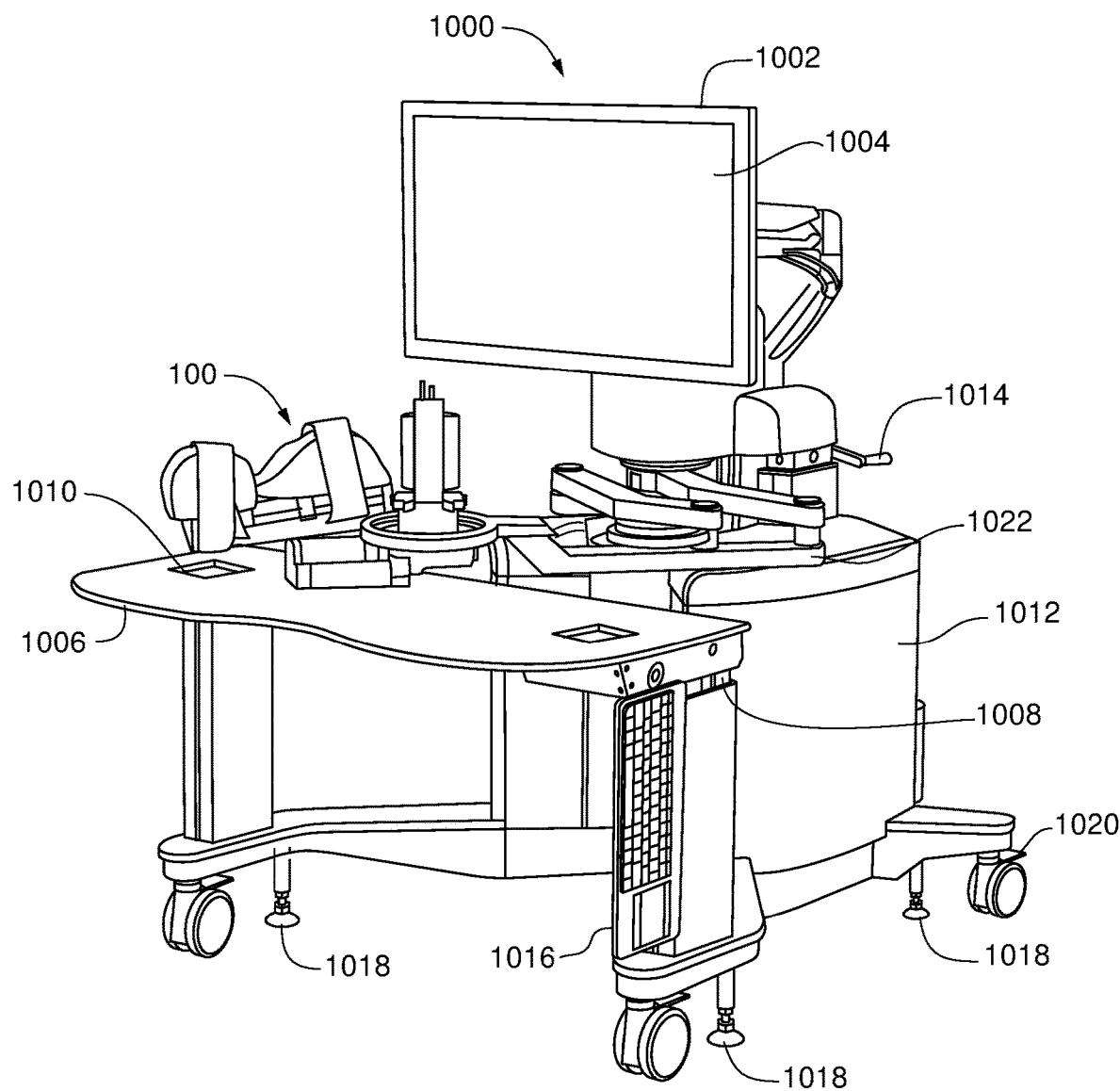
FIG. 2 is a perspective view of the InMotion ARM/HAND™ robot employing the hand robot assembly in accordance with an embodiment of the present invention.

Referring to FIGS. 2, 12 and 13, there is shown an embodiment of the hand and arm support assembly 100 connectable to a support structure. The hand and arm support assembly 100 is adapted for use with InMotion ARM/HAND™ apparatus 1000 provided by BIONIK LABORATORIES CORP. (Toronto, ON, Canada) as shown in FIGS. 2, 12 and 13. The InMotion Hand™ and InMotion Arm™ robots preferably work together to provide motor therapy that combines reaching with grip and release movements. The robots quietly monitor the patient's movements during therapy and may gently assist as needed to help the patient complete various motor therapy activities. InMotion robots may be used by patients experiencing a wide range of motor impairments including, but not limited to, stroke, cerebral palsy, spinal cord injury, multiple sclerosis, Parkinson's disease, hemiplegic shoulder pain and/or muscle spasticity.

As shown in FIGS. 2, 12 and 13, the InMotion ARM/HAND™ apparatus 1000 is an integrated patient workstation that, among others, includes: the hand and arm support assembly 100; a monitor 1002; a monitor screen 1004 for use by the patient; a table 1006; a table height adjustment 1008 to accommodate patients of different sizes; a stop button 1010 to terminate the therapy session; a control box 1012 containing the processor, memory and/or database; a robot height adjustment 1014 to accommodate patients of different sizes; an input device 1016 (e.g., keyboard); leveling feet 1018 (4 total); and wheel locks 1020 (4 total). In addition, the InMotion apparatus provides easy cleaning of smooth surfaces, hidden hand mounting screws, reduced pinch points and/or hidden cables when possible within the support structure 1022.

In a preferred embodiment, the hand and arm support assembly 100 of the present invention includes a hand actuator assembly 200 and a forearm rest assembly 400.

Hand Actuator Assembly

Figure 3:
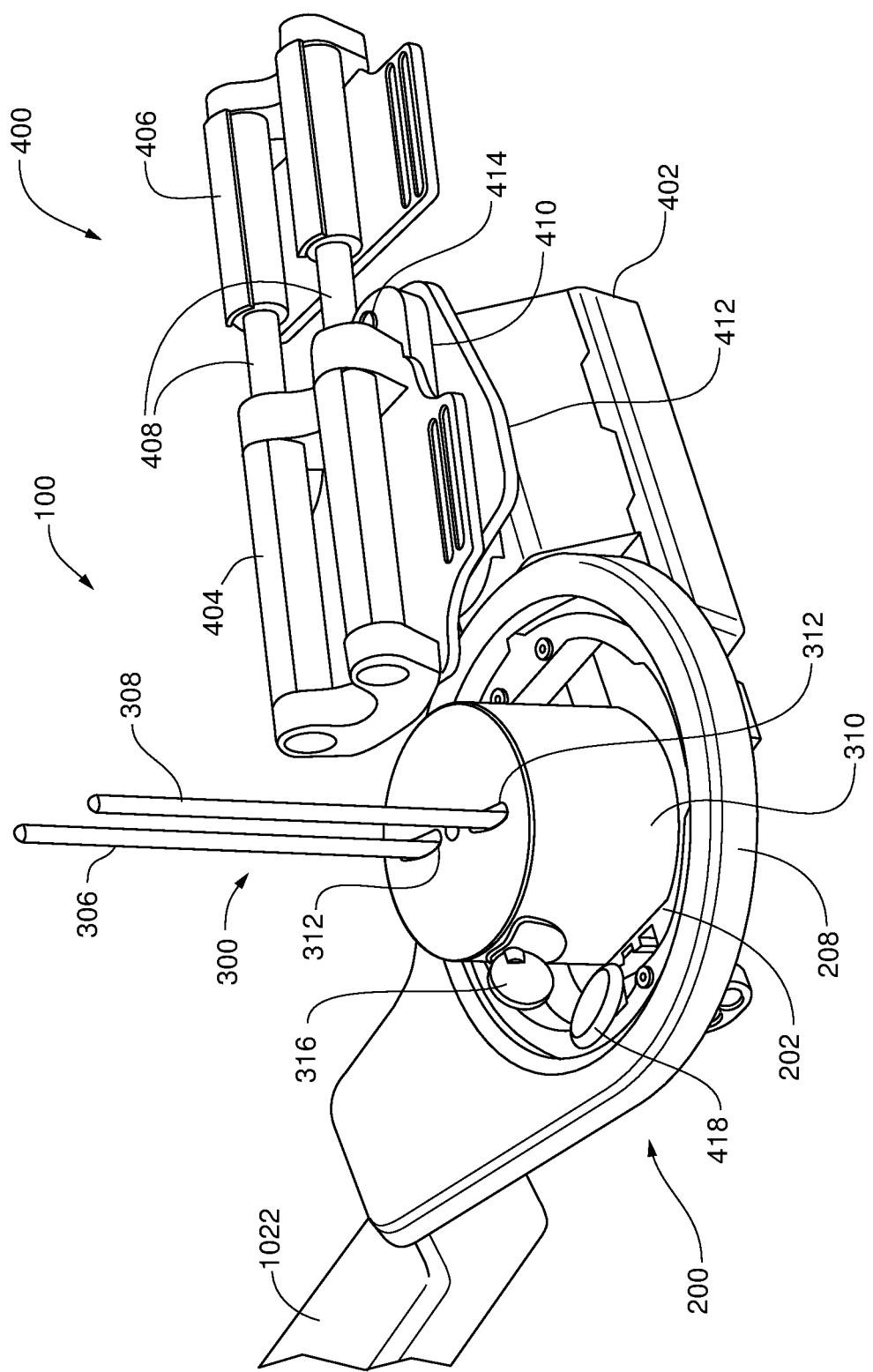
FIG. 3 is a perspective view of the hand and arm support assembly in accordance with a preferred embodiment.
Figure 4:
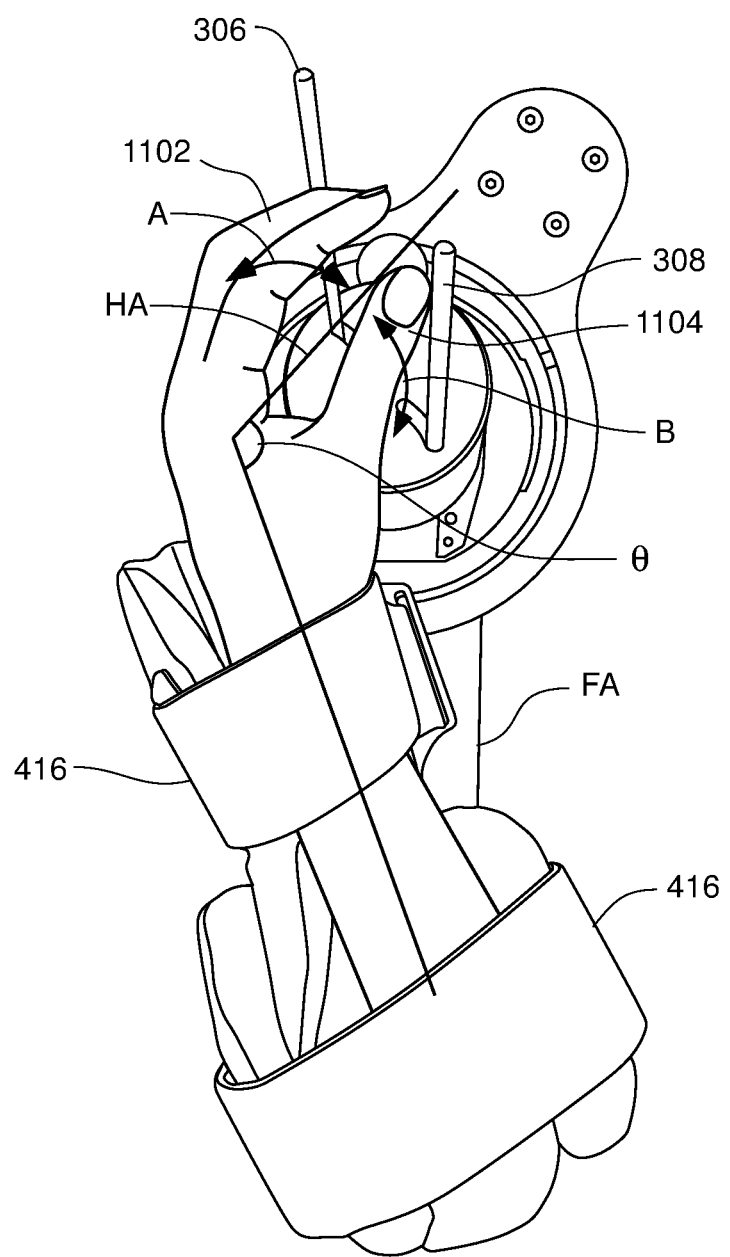
FIG. 4 is a top view of the hand and arm support assembly with the hand and forearm of a user.
Figure 5:
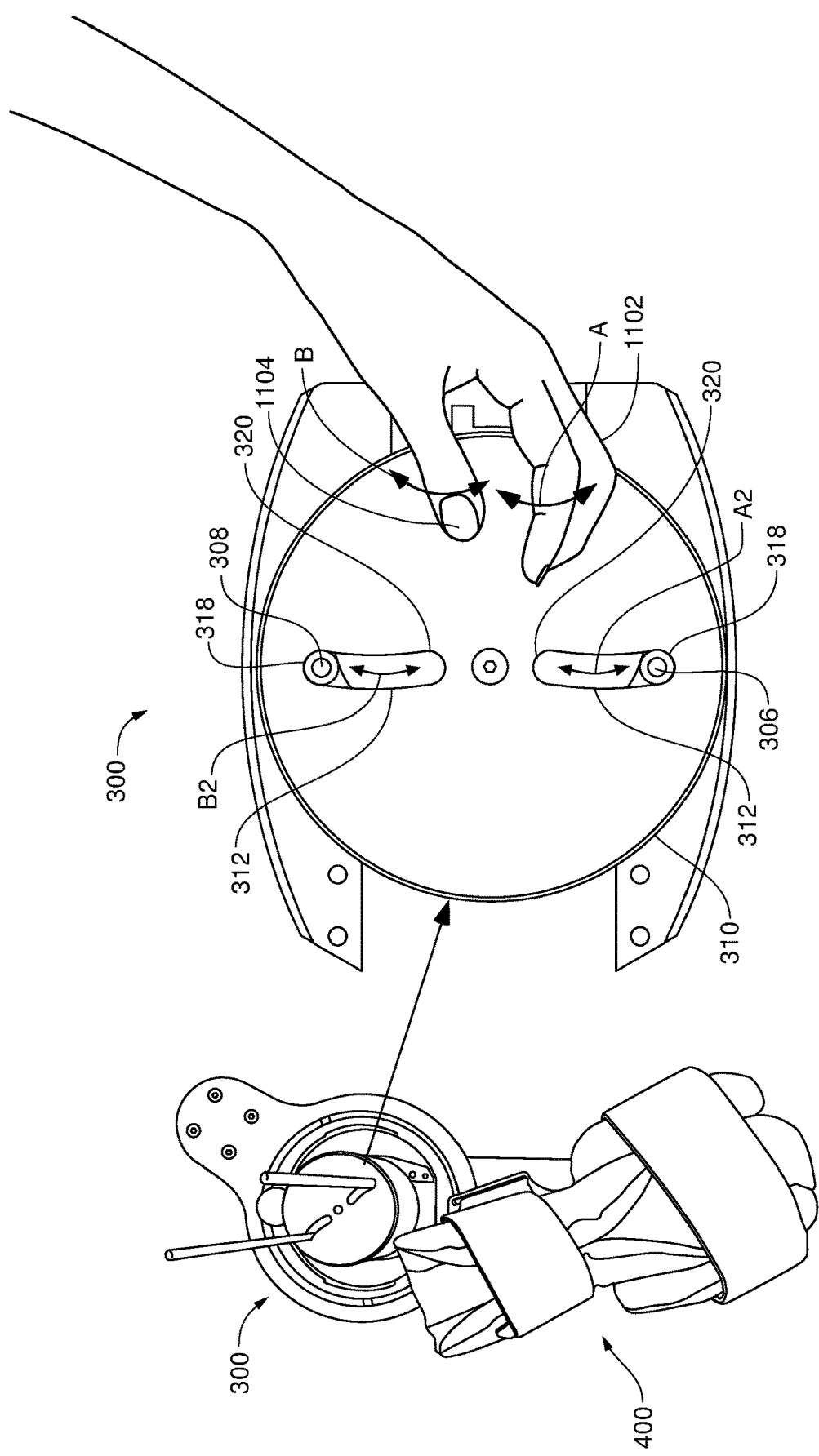
FIG. 5 is a top view of the hand engagement assembly showing movement of the first and second rod engagement members.

The hand actuator assembly 200 is preferably in the nature of an annular support as shown in FIG. 3. The hand actuator assembly 200 preferably includes a support base 202 and a hand engagement assembly 300. The hand engagement assembly includes first 306 and second 308 hand actuator rod engagement members (alternately "posts", "stems", "rods", and/or "hand/palm/finger engagement members") extending in an upwards direction from a cylindrical housing 310 mounted on the support base 202. In a preferred embodiment, the first rod engagement member 306 is adapted to engage the fingers 1102 of a user (i.e., index finger, middle finger, ring finger, and little finger) and the second rod engagement member 308 is adapted to engage the thumb 1104 of the user as shown in FIG. 4. Preferably, the first 306 and second 308 rod engagement members are moveable relative to one another as shown in FIGS. 4 and 5 to facilitate grasping and release motions of the user. Movement of the rod engagement members is preferably constrained by slots 312 defined by the cylindrical housing 310 as shown in FIG. 5. In preferred embodiments, the slots 312 (i) are arcuate in shape to account for the finger arc 326 and thumb arc 328 motion of an average hand and (ii) have a distal end 318 and a proximal end 320. Preferably, movement of the rod engagement members is translated in an arc (as depicted by arrows "A2" and "B2") to follow the radius of the average finger and thumb of users (as depicted by arrows "A" and "B" respectively), whereby: (i) movement of the A2 arrow towards the B2 arrow represents movement of the rod engagement members that approximates the grasping motion of the fingers and thumb of a user; and (ii) movement of the A2 arrow away from the B2 arrow represents movement of the rod engagement members that approximates the release motion of the fingers and thumb of a user.

Figure 6:
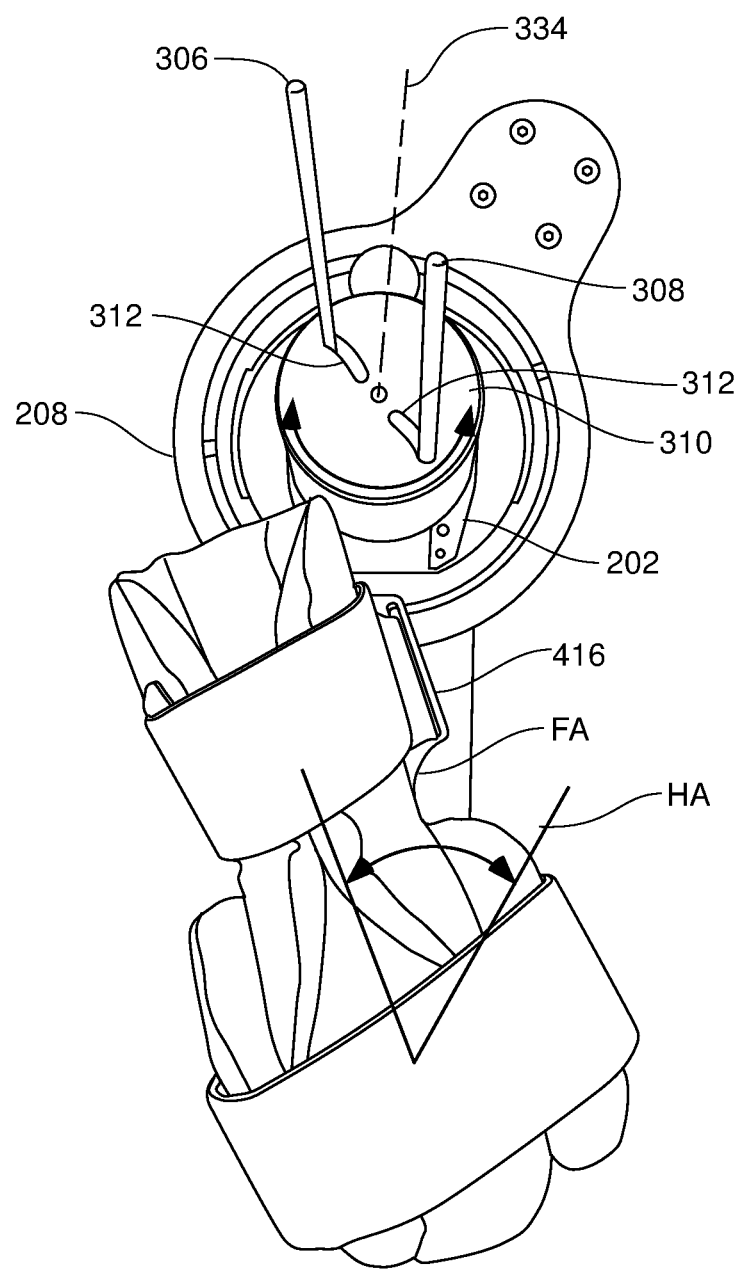
FIG. 6 is a top view of the hand engagement assembly showing rotation of the cylindrical housing.
Figure 7B:
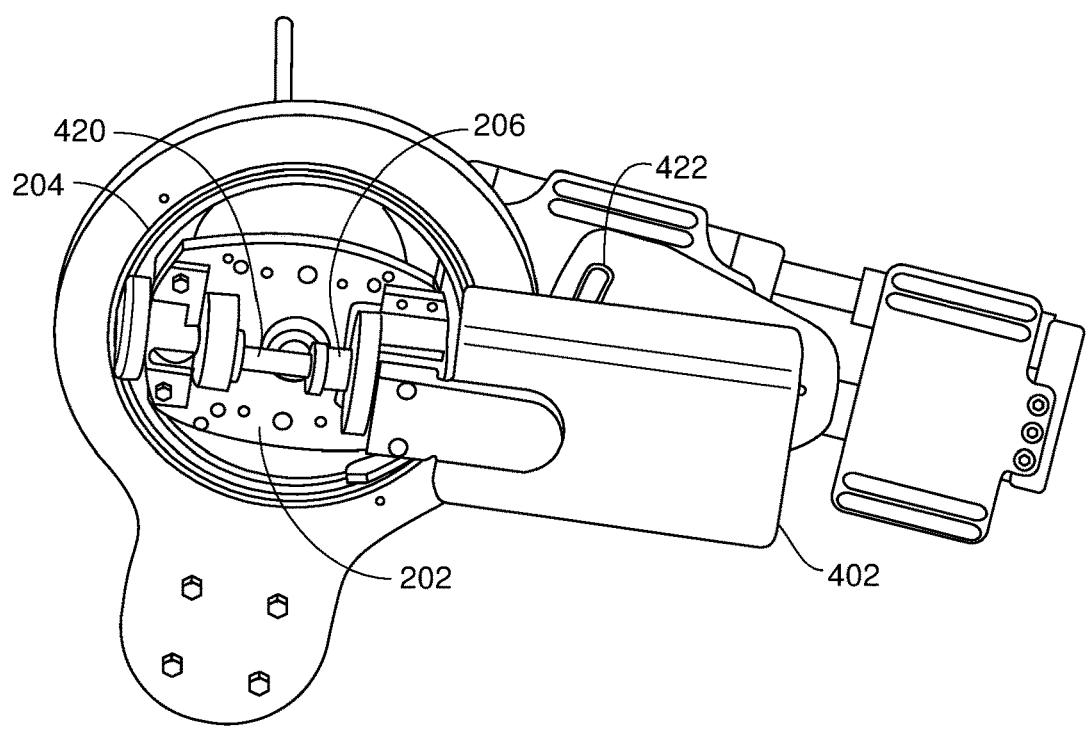

In a preferred embodiment, the hand engagement assembly 300 is rotatable about a rotational axis 334 relative to the annular support 208 as shown in FIGS. 6, 7A and 7B to accommodate the finger and thumb position of the user. Preferably, the rotational position of the hand engagement assembly can be changed by predetermined increments (e.g., 1, 2, 3, 4, 5, 10, 20 degree increments) to account for the position of the user's hand. In a preferable embodiment, the rod engagement members rotate in 10 degree increments to align with the finger and thumb location of the user. In an alternate embodiment (not shown), the rod engagement members are adapted to rotate to any desired position (i.e., not a set increment) to precisely align with the finger and thumb location of the user. The rod engagement members are preferably rotated by disengaging a rotation lock 316 (e.g., pulling the rotation lock or button away from the cylindrical housing and rotating it to an unlocked position as shown in FIG. 3). The rod engagement members are preferably rotated in predetermined detented movements (e.g., 10 degree increments) by hand to best line up with the finger 1102 and thumb 1104 of the patient. Persons skilled in the art will understand that a detent is a device used to mechanically resist or arrest the rotation of a wheel, axle, or spindle and may include a simple metal pin or resilient member to a machine. Persons skilled in the art will further understand that predetermined detented movements facilitate rapid calibration of the hand engagement assembly 300 by limiting the number of rotational positions available to the rod engagement members while still providing the ability to position the rod engagement members to accommodate the fingers and thumb of the user (i.e., the differing angle θ for each user). The rotation lock 316 or button is re-engaged (e.g., rotated 90 degrees) to a lock position to secure rod engagement members in position.

The first 306 and second 308 rod engagement members, as shown in FIG. 5, are preferably urged or biased towards the distal end of their respective slots 312 (i.e., biased away from each other or movement of arrow A2 away from arrow B2) by a resilient member to provide a level of resistance for the user during engagement (e.g., grasping and release). In preferable embodiments, the level of resistance is adjustable and/or may be predetermined (e.g., measured in kg similar to a dynamometer). As used herein, a person skilled in the relevant art would understand that a "resilient member" may comprise one or more of any of the following elastic, pneumatic, gas spring, constant force spring motor, or other device adapted to store or exert mechanical energy and/or generate force. In a preferred embodiment, a resilient member comprises a spring.

In a preferred embodiment, travel of the first 306 and second 308 rod engagement members along their respective slots 312 is constrained by a proximal end range position 324 and a distal end range position 322 as shown in FIG. 8C. In preferred embodiments, the proximal 324 and distal 322 end range positions may be varied and/or predetermined by adjusting the position of one or more rod engagement member stops (i.e., a mechanical barrier to prevent the first and/or second rod engagement member from travelling beyond the proximal and/or distal end range position).

FIG. 11 depicts an exploded view of the hand actuator assembly 200 in accordance with a preferred embodiment of the present invention. The cylindrical housing 310 is adapted to include a pinch guard 350 (which may, for example, facilitate determination of the distal end range position 322 and/or the proximal end range position 324), a tower cap 352 to seal the top or upper opening of the housing 310, and a tower cap decal 354 to convey information to the user (e.g., an arrow to indicate the rotational angle of the hand actuator assembly 200 to facilitate rapid calibration of the hand and arm support assembly 100 for a given user). The pinch guard 350, tower cap 352 and/or tower cap decal 354 is preferably secured to a crankshaft 330 (described below) by a top fastener. In a preferred embodiment, the pinch guard 350 rests on an O-ring 356 (e.g., an oil-resistant hard buna-n O-ring) or mechanical gasket to create a seal. In a preferred embodiment, the pinch guard 350 defines a chamfer 364 (i.e., a transitional edge) for receiving the top fastener. When positioned within the housing 310, the pinch guard 350, tower cap 352 and tower cap decal 354 are adapted to receive the rod engagement members 306, 308. The crankshaft 330 is preferably mounted on a bearing 358 (e.g., an angular-contact ball bearing) to facilitate rotational movement of the rod engagement members 306, 308. The housing 310 is preferably further adapted to house the crank shaft 330 and rest on the support base 202. In preferred embodiments, the base 202 defines a bore 360 for receiving the bearing 358 and the bearing 358 is adapted to receive the bevel gear 332 as described below.

In preferable embodiments, a thumb latch 366 is mounted on a bottom surface of the support base to facilitate the connection of the hand engagement assembly 300 to the forearm rest assembly 400.

As shown in FIG. 11, the housing is further adapted to receive the rotation lock 316 (as described above) which in preferred embodiments includes a rotation lock cover 362.

Forearm Rest Assembly

The forearm rest assembly 400 is preferably in the nature of a support block 402 and pivotably (about a rest assembly rotation axis 420) or fixedly connected to the support base 202 as shown in FIGS. 3, 7A and 7B. The forearm rest assembly includes a first carriage 404 (alternately "arm carriage 404") adapted to receive a forearm of the user and a second carriage 406 (alternately "elbow carriage 406") adapted to receive an elbow of the user. In preferable embodiments, the second carriage 406 is cantilevered and the space (or distance, indicated by "X" as shown in FIG. 7A) between the first 404 and second 406 carriages can be adjusted. As shown in FIG. 7A, the second carriage is preferably cantilevered or extending away from the flange member 412. Preferably, the first carriage 404 and second carriage 406 are constrained by parallel guide or shaft members 408 to facilitate slidable movement of the second carriage 406 towards or away from the first carriage 404 to accommodate arms of differing lengths. For example, to accommodate a user with a shorter arm, the second carriage 406 is moved along the shaft members 408 to a position closer to the first carriage 404 to decrease the distance between the second carriage 406 and the first carriage 404. In contrast, to accommodate a user with a longer arm, the second carriage 406 is moved along the shaft members 408 to a position away from the first carriage 404 to increase the distance between the second carriage 406 and the first carriage 404.

In preferred embodiments, the first carriage includes a plate 410 that is fastened to the underside of the first carriage base as shown in FIGS. 3, 7A and 7B. The plate 410 is pivotably connected to the support block 402 and adapted for rotation about a pivot axis 414. A flange member 412 is preferably fastened to the support block 402. The plate 410 preferably includes a pin projecting in a downward direction that is captively retained in a slot 422 defined by the flange member 412. The slot 422 preferably constrains the range of rotational movement of the first 404 and second carriage 406 relative to the support block 402. The pivot axis 414 is preferably positioned between the first carriage 404 and the second carriage 406 (e.g., approximately around the forearm center of the user) with a large range of rotation to accommodate high tone patients by facilitating contact with the rods by the user. Persons having ordinary skill in the art will understand that patients with high tone have too much muscle tone—such as hypertonia—so that the arms or legs, for example, are stiff and difficult to move.

In preferred embodiments, the first 404 and second carriages 406 are adapted (e.g., using slots 424) to receive straps 416 (e.g., Velcro) to secure the arm and/or elbow to the forearm rest assembly as shown in FIGS. 4 and 6. The forearm rest assembly 400, together with the straps 416, preferably provide a Velcro adjustable, soft and cushioned surface to rest the arm of a user during therapy.

In a preferred embodiment, the angle of pronation and supination of the forearm rest assembly and/or the hand engagement assembly can be adjusted about a rest assembly rotation axis 420 relative to the annular support 208. The angle of pronation and supination is preferably up to 30 degrees about the rest assembly rotation axis 420 (i.e., to the left or right) relative to the annular support and may be adjusted by disengaging a forearm rest assembly lock 418 (alternately "release button 418"), rotating the forearm rest assembly 400 about the rest assembly rotation axis 420 (as shown in FIGS. 7A and 7B) and re-engaging the forearm rest assembly lock 418. Such an adjustment assists with comfortably positioning users with increased forearm tone or reduced joint range of motion.

As shown in FIGS. 7B and 11, the hand actuator assembly 200 preferably includes a motor and gears adapted to drive the first hand actuator rod engagement member 306 and the second hand actuator engagement member 308 through a crank arm system 206. FIG. 11 depicts a detailed exploded view of the hand actuator assembly 200. In a preferred embodiment, a crankshaft 330 includes two projections 368 (or "arms 368") adapted to drive the first and second hand actuator rod engagement members 306, 308 by, for example, linking the crankshaft 330 to the engagement members 306, 308. Preferably, a bevel gear 332 received by the support base 202 is driven by a matching bevel gear 206 associated with the motor/transmission mounted under the forearm rest assembly 400 as shown in FIG. 7B.

In a preferred embodiment, the support block 402 is rotatably connected to the annular support 208 by a bearing 204 to allow for rotation of the hand engagement assembly 300 and forearm rest assembly 400 about the plane of the annular support 208 as shown in FIGS. 7A and B.

In preferred embodiments, the first 306 and second 308 rod engagement members are adapted to retain a first curved hand engagement member 502 and a second curved hand engagement member 504 respectively. The hand engagement members facilitate actuation of the rod engagement members by the user (e.g., grasping and releasing). In a preferred embodiment, the first curved hand engagement member 502 is adapted to secure the thumb 1104 of the user to the first rod engagement member 306 and the second curved hand engagement member 504 is adapted to secure the fingers 1102 of the user to the second rod engagement member 308. Preferably, the first 502 and second 504 curved hand engagement members are adapted (e.g., using slots) to receive straps 506 (e.g., Velcro) to secure the thumb 1104 and fingers 1102 respectively to the rod engagement members. The straps 506 include a Velcro adjustable, soft and cushioned surface for comfortable use of the apparatus by the user. As shown in FIGS. 8A, 8B and 9 the curved hand engagement members include a series of holes 508 to facilitate adjustment of the starting position of the user's hand to, for example, determine the optimal position relative to the user's fingers 1102, accommodate different hand sizes of the user and/or vary the starting position of the user's hand (e.g., a larger or smaller range of motion). In an embodiment of the present invention, use of the holes 508 that are distal to the palm of the user can be used to set a smaller range of motion during user engagement while use of the holes that are proximal to the palm of the user can be used to set a larger range of motion during engagement. In addition, in preferable embodiments as shown in FIG. 9, the second curved hand engagement member 504 includes holes 508 on a first edge (indicated by the letter markings corresponding to "A", "B", "C", "D", "E", "F" and "G") and a second edge (indicated by the letter markings corresponding to "H", "I", "J", "K", "L", "M" and "N") to facilitate ease of recording the optimal position for a given user by, for example, assigning the top edge markings to the right hand of the user and the bottom edge markings to the left hand of the user. Preferably, the second curved hand engagement member 504 is received by the first rod engagement member 502 during rehabilitation of the left hand of the user.

FIG. 10 is an enlarged view of the first curved hand engagement member 502 that depicts a friction brake 510 adapted to maintain the position of the first curved hand engagement member 502 relative to the first rod engagement member 502. Also depicted is a thumb grip 512 adapted to support the thumb of the user at its natural angled position for grasping.

Method for Hand Positioning

The method is described in conjunction with an embodiment of the hand and arm support assembly of the present invention and it will be understood that the present method may be used with other hand robots, assemblies, devices and/or apparatuses for rehabilitating the hand of a patient as set out in the INSTRUCTIONS FOR USE document for the InMotion ARM/HAND™ herein incorporated by reference.

In accordance with a preferred embodiment, positioning of a hand of the user may be carried out as follows:

1. Click the "set hand position" button on the computer interface.
2. Place the finger grip (i.e., second curved hand engagement member) on to the vertical rod (i.e., second rod engagement member), for example, starting with the center hole.
3. Adjust hold location for best position relative to the patient's fingers.
4. Repeat process for the Thumb Grip (i.e., first curved hand engagement member) and the first rod engagement member starting with the center hole.
5. Turn the rotation release tab to the vertical position and rotate the vertical rods for the best finger and thumb grip placement (i.e., rotate cylindrical housing).
6. Adjust hold locations of finger and thumb grips (i.e., adjust proximal and distal end range positions) as well as hand rotation position (i.e., holes for the first and curbed hand engagement member) as required.
7. Record the finger grip, thumb grip and hand rotation settings and click "accept" using the computer interface.

The foregoing method—and in particular the ability to rotate the rod engagement members, pivot the forearm rest assembly, and adjust the angle of pronation and supination of the forearm rest assembly and/or the hand engagement assembly—preferably allows an operator to minimize set up time (e.g., calibration) of the hand and arm support assembly for a given user. In a preferred embodiment, the optimal hand position is recorded (e.g., in a database) to further minimize patient set up time during subsequent rehabilitation sessions System The present disclosure may be described herein with reference to system architecture, block diagrams and flowchart illustrations of methods, and computer program products according to various aspects of the present disclosure. It may be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It may also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The present disclosure may now be described in terms of an exemplary system in which the present disclosure, in various embodiments, would be implemented. This may be for convenience only and may be not intended to limit the application of the present disclosure. It may be apparent to one skilled in the relevant art(s) how to implement the present disclosure in alternative embodiments.

In this disclosure, a number of terms and abbreviations may be used. The following definitions and descriptions of such terms and abbreviations are provided in greater detail.

It should also be appreciated that the present invention can be implemented in numerous ways, including as a system, a device, a method, or a computer readable medium wherein program instructions are sent over a network (e.g., IoT optical or electronic communication links). In this specification, these implementations, or any other form that the invention may take, may be referred to as processes or methods. In general, the order of the steps of the disclosed processes may be altered within the scope of the invention.

Preferred embodiments of the present invention can be implemented in numerous configurations depending on implementation choices based upon the principles described herein. Various specific aspects are disclosed, which are illustrative embodiments not to be construed as limiting the scope of the disclosure. Although the present specification describes components and functions implemented in the embodiments with reference to standards and protocols known to a person skilled in the art, the present disclosures as well as the embodiments of the present invention are not limited to any specific standard or protocol. Each of the standards for non-mobile and mobile computing, including the Internet and other forms of computer network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

As those of ordinary skill in the art would generally understand, the Internet is a global computer network which comprises a vast number of computers and computer networks which are interconnected through communication links. A person skilled in the relevant art may understand that an electronic communications network of the present invention, may include, but is not limited to, one or more of the following: a local area network, a wide area network, peer-to-peer communication, an intranet, or the Internet. The interconnected computers exchange information using various services, including, but not limited to, electronic mail, Gopher, web-services, application programming interface (API), File Transfer Protocol (FTP). This network allows a server computer system (a Web server) to send graphical Web pages of information to a remote client computer system. The remote client computer system can then display the Web pages via its web browser. Each Web page (or link)

of the "world wide web" ("WWW") is uniquely identifiable by a Uniform Resource Locator (URL). To view a specific Web page, a client computer system specifies the URL for that Web page in a request (e.g., a HyperText Transfer Protocol ("HTTP") request). The request is forwarded to the Web server that supports the Web page. When the Web server receives the request, it sends the Web page to the client computer system. When the client computer system receives the Web page, it typically displays the Web page using a browser. A web browser or a browser is a special-purpose application program that effects the requesting of web pages and the displaying of web pages and the use of web-based applications. Commercially available browsers include Microsoft Internet Explorer and Firefox, Google Chrome among others. It may be understood that with embodiments of the present invention, any browser would be suitable.

Web pages are typically defined using HTML. HTML provides a standard set of tags that define how a Web page is to be displayed. When a provider indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems.

A person skilled in the relevant art may generally understand a web-based application refers to any program that is accessed over a network connection using HTTP, rather than existing within a device's memory. Web-based applications often run inside a web browser or web portal. Web-based applications also may be client-based, where a small part of the program is downloaded to a user's desktop, but processing is done over the Internet on an external server. Web-based applications may also be dedicated programs installed on an internet-ready device, such as a smart phone or tablet. A person skilled in the relevant art may understand that a web site may also act as a web portal. A web portal may be a web site that provides a variety of services to users via a collection of web sites or web based applications. A portal is most often one specially designed site or application that brings information together from diverse sources in a uniform way. Usually, each information source gets its dedicated area on the page for displaying information (a portlet); often, the user can configure which ones to display. Portals typically provide an opportunity for users to input information into a system. Variants of portals include "dashboards". The extent to which content is displayed in a "uniform way" may depend on the intended user and the intended purpose, as well as the diversity of the content. Very often design emphasis is on a certain "metaphor" for configuring and customizing the presentation of the content and the chosen implementation framework and/or code libraries. In addition, the role of the user in an organization may determine which content can be added to the portal or deleted from the portal configuration.

It may be generally understood by a person skilled in the relevant art that the term "mobile device" or "portable device" refers to any portable electronic device that can be used to access a computer network such as, for example, the internet. Typically, a portable electronic device comprises a display screen, at least one input/output device, a processor, memory, a power module and a tactile man-machine interface as well as other components that are common to portable electronic devices individuals or members carry with them on a daily basis. Examples of portable devices suitable for use with the present invention include, but are not limited to, smart phones, cell phones, wireless data/email devices, tablets, PDAs and MP3 players, etc.

It may be generally understood by a person skilled in the relevant art that the term "network ready device" or "internet ready device" refers to devices that are capable of connecting to and accessing a computer network, such as, for example, the Internet, including but not limited to an IoT device. A network ready device may assess the computer network through well-known methods, including, for example, a web-browser. Examples of internet-ready devices include, but are not limited to, mobile devices (including smart-phones, tablets, PDAs, etc.), gaming consoles, and smart-TVs. It may be understood by a person skilled in the relevant art that embodiment of the present invention may be expanded to include applications for use on a network ready device (e.g. cellphone). In a preferred embodiment, the network ready device version of the applicable software may have a similar look and feel as a browser version but that may be optimized to the device. It may be understood that other "smart" devices (devices that are capable of connecting to and accessing a computer network, such as, for example, the internet) such as sensors or actuators, including but not limited to smart valves, smart lights, IoT devices, etc.

It may be further generally understood by a person skilled in the relevant art that the term "downloading" refers to receiving datum or data to a local system (e.g., mobile device) from a remote system (e.g., a client) or to initiate such a datum or data transfer. Examples of a remote systems or clients from which a download might be performed include, but are not limited to, web servers, FTP servers, email servers, or other similar systems. A download can mean either any file that may be offered for downloading or that has been downloaded, or the process of receiving such a file. A person skilled in the relevant art may understand the inverse operation, namely sending of data from a local system (e.g., mobile device) to a remote system (e.g., a database) may be referred to as "uploading". The data and/or information used according to the present invention may be updated constantly, hourly, daily, weekly, monthly, yearly, etc. depending on the type of data and/or the level of importance inherent in, and/or assigned to, each type of data. Some of the data may preferably be downloaded from the Internet, by satellite networks or other wired or wireless networks.

Elements of the present invention may be implemented with computer systems which are well known in the art. Generally speaking, computers include a central processor, system memory, and a system bus that couples various system components including the system memory to the central processor. A system bus may be any of several types of bus structures including a memory bus or memory controller, a peripheral bus, and a local bus using any of a variety of bus architectures. The structure of a system memory may be well known to those skilled in the art and may include a basic input/output system ("BIOS") stored in a read only memory ("ROM") and one or more program modules such as operating systems, application programs and program data stored in random access memory ("RAM"). Computers may also include a variety of interface units and drives for reading and writing data. A user of the system can interact with the computer using a variety of input devices, all of which are known to a person skilled in the relevant art.

One skilled in the relevant art would appreciate that the device connections mentioned herein are for illustration purposes only and that any number of possible configurations and selection of peripheral devices could be coupled to the computer system.

Computers can operate in a networked environment using logical connections to one or more remote computers or other devices, such as a server, a router, a network personal computer, a peer device or other common network node, a wireless telephone or wireless personal digital assistant. The computer of the present invention may include a network interface that couples the system bus to a local area network ("LAN"). Networking environments are commonplace in offices, enterprise-wide computer networks and home computer systems. A wide area network ("WAN"), such as the Internet, can also be accessed by the computer or mobile device.

It may be appreciated that the type of connections contemplated herein are exemplary and other ways of establishing a communications link between computers may be used in accordance with the present invention, including, for example, mobile devices and networks. The existence of any of various well-known protocols, such as TCP/IP, Frame Relay, Ethernet, FTP, HTTP and the like, may be presumed, and computer can be operated in a client-server configuration to permit a user to retrieve and send data to and from a web-based server. Furthermore, any of various conventional web browsers can be used to display and manipulate data in association with a web based application.

The operation of the network ready device (i.e., a mobile device) may be controlled by a variety of different program modules, engines, etc. Examples of program modules are routines, algorithms, programs, objects, components, data structures, etc. that perform particular tasks or implement particular abstract data types. It may be understood that the present invention may also be practiced with other computer system configurations, including multiprocessor systems, microprocessor-based or programmable consumer electronics, network PCS, personal computers, minicomputers, mainframe computers, and the like. Furthermore, the invention may also be practiced in distributed computing environments where tasks are performed by remote processing devices that are linked through a communications network. In a distributed computing environment, program modules may be located in both local and remote memory storage devices.

Embodiments of the present invention may implement Artificial Intelligence ("AI") or machine learning ("ML") algorithms. AI and ML algorithms are general classes of algorithms used by a computer to recognize patterns and may include one or more of the following individual algorithms: nearest neighbor, naive Bayes, decision trees, linear regression, principle component analysis ("PCA"), support vector machines ("SVM"), evolutionary algorithms, and neural networks. These algorithms may "learn" or associate patterns with certain responses in several fashions, including: supervised learning, unsupervised learning, semi-supervised learning, and reinforcement learning.

Embodiments of the present invention can be implemented by a software program for processing data through a computer system. It may be understood by a person skilled in the relevant art that the computer system can be a personal computer, mobile device, notebook computer, server computer, mainframe, networked computer (e.g., router), workstation, and the like. In one embodiment, the computer system includes a processor coupled to a bus and memory storage coupled to the bus. The memory storage can be volatile or non-volatile (i.e. transitory or non-transitory) and can include removable storage media. The computer can also include a display, provision for data input and output, etc. as may be understood by a person skilled in the relevant art.

Some portion of the detailed descriptions that follow are presented in terms of procedures, steps, logic block, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc. is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers or the like.

While computer-readable storage medium may be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

It may generally be understood by a person skilled in the relevant art that the term "cloud computing" is an information technology model that facilitates ubiquitous access to shared pools of configurable system resources and higher-level services that can be provisioned with minimal management effort, usually over the Internet. Third-party clouds preferably enable organizations to focus on their core businesses instead of allocating resources on computer infrastructure and maintenance.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

This concludes the description of presently preferred embodiments of the invention. The foregoing description has been presented for the purpose of illustration and is not intended to be exhaustive or to limit the invention to the precise form disclosed. Other modifications, variations and alterations are possible in light of the above teaching and will be apparent to those skilled in the art, and may be used in the design and manufacture of other embodiments according to the present invention without departing form the spirit

What is claimed is:

1. A hand and arm support assembly for use by a user to rehabilitate a hand, including optimizing the position of a thumb and one or more fingers of the user and stabilizing a forearm of the user, the assembly comprising:
   a hand actuator assembly to accommodate the hand of the user comprising:
      a support,
      a finger holder adapted to receive the one or more fingers of the user,
      a thumb holder adapted to receive the thumb of the user,
      a hand engagement assembly mounted on the support comprising
         a housing defining at least one slot,
         one or more rod engagement members projecting upwardly from the housing and adapted to receive one or more of the finger holder and the thumb holder and travel within the at least one slot based on movement of the hand,
      wherein the housing is rotatable about a rotational axis to accommodate a resting position of the hand of the user, and
   a forearm rest assembly associated with the hand actuator assembly, the forearm rest assembly comprising a carriage adapted to receive the forearm of the user.

2. The assembly of claim 1, wherein the one or more rod engagement members of the hand actuator assembly are configured to be grasped by the one or more fingers and the thumb of the user.

3. The assembly of claim 1, wherein the at least one slot is configured to allow displacement of the one or more rod engagement members towards each other and away from each other to facilitate a grasping motion between the one or more fingers and the thumb of the user to facilitate the rehabilitation of the user's hand.

4. The assembly of claim 1, wherein the at least one slot is arcuate in shape.

5. The assembly of claim 1, wherein the at least one slot includes a first slot and a second slot and wherein the one or more rod engagement members include a first rod engagement member and a second rod engagement member.

6. The assembly of claim 5, wherein the first slot and second slot are arcuate in shape.

7. The assembly of claim 5, wherein the first slot and second slot are spaced apart from each other, the first slot and second slot each having a distal end and a proximal end, wherein the distal ends of the first slot and second slot being in proximity to opposing edges of the housing.

8. The assembly of claim 1, wherein the thumb holder is adapted to receive straps to secure the thumb of the user to the thumb holder.

9. The assembly of claim 1, wherein the thumb holder includes a plurality of holes, wherein each of the plurality of holes is adapted to receive one of the one or more rod engagement members projecting upwardly from the housing.

10. The assembly of claim 9, wherein the hand engagement assembly is rotatable in 10 degree increments.

11. The assembly of claim 1, wherein the finger holder is adapted to receive straps to secure the one or more fingers of the user to the finger holder.

12. The assembly of claim 1, wherein the finger holder includes a plurality of holes, wherein each of the plurality of holes is adapted to receive one of the one or more rod engagement members projecting upwardly from the housing.

13. The assembly of claim 1, wherein the hand engagement assembly is rotatable about a rotational axis relative to the support.

14. A method for orienting a thumb and fingers of a user in a hand and arm support assembly for use in rehabilitating a hand, wherein the method comprises the steps of:
   (a) providing a first hand actuator rod engagement member and a second hand actuator rod engagement member upwardly projecting from a housing, the housing defining a first slot and a second slot, the first hand actuator engagement member configured to travel within the first slot based on movement of the hand and second hand actuator rod engagement member configured to travel within the second slot based on movement of the hand;
   (b) positioning a first curved hand engagement member, associated with the thumb of the user, on the first hand actuator rod engagement member;
   (c) positioning a second curved hand engagement member, associated with the fingers of the user, on the second hand actuator rod engagement member;
   (d) selecting a rotational position for a hand engagement assembly associated with the first hand actuator rod engagement member and the second hand actuator rod engagement member to optimize placement of the thumb and fingers of the user; and
   (e) recording the positions of the first curved hand engagement member, the second curved hand engagement member and the hand engagement assembly.

15. The method of claim 14, wherein the first hand actuator rod engagement member and the second hand actuator rod engagement member are configured to be grasped by the fingers and the thumb of the user.

16. The method of claim 14, wherein the slots are configured to allow displacement of the first hand actuator rod engagement member and the second hand actuator rod engagement member towards each other and away from each other to facilitate a grasping motion between the fingers and the thumb of the user to facilitate the rehabilitation of the user's hand.

17. The method of claim 14, wherein the first curved hand engagement member includes a plurality of holes, wherein each of the plurality of holes is adapted to receive the first hand actuator rod engagement member, wherein positioning the first curved hand engagement member on the first hand actuator rod engagement member includes determining a hole of the plurality of holes to receive the first hand actuator rod engagement member.

18. The method of claim 14, wherein the second curved hand engagement member includes a plurality of holes, wherein each of the plurality of holes is adapted to receive the second hand actuator rod engagement member, wherein positioning the second curved hand engagement member on the second hand actuator rod engagement member includes determining a hole of the plurality of holes to receive the second hand actuator rod engagement member.

19. The method of claim 14, wherein the first slot and second slot are arcuate in shape.

20. The method of claim 14, wherein the first slot and second slot are spaced apart from each other, the first slot and second slot each having a distal end and a proximal end, wherein the distal ends of the first slot and second slot being in proximity to opposing edges of the housing.

* * * * *